(12) United States Patent
Quintana

(10) Patent No.: US 7,502,138 B2
(45) Date of Patent: Mar. 10, 2009

(54) SPACING OUT OUTPUT OF PIXELS FOR OTHER COLOR COMPONENTS UPON OUTPUT OF PIXEL FOR COLOR COMPONENT OF AN IMAGE PIXEL

(75) Inventor: Jason Quintana, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 866 days.

(21) Appl. No.: 10/304,492

(22) Filed: Nov. 25, 2002

(65) Prior Publication Data

US 2004/0100646 A1 May 27, 2004

(51) Int. Cl.
*G06F 15/00* (2006.01)
*G06K 1/00* (2006.01)

(52) U.S. Cl. ...................... 358/1.9; 358/3.03

(58) Field of Classification Search .................. 358/1.9, 358/3.03–3.06, 518, 3.26, 534; 382/162–167, 382/252, 271, 275
See application file for complete search history.

(56) References Cited

U.S. PATENT DOCUMENTS

| | | | | |
|---|---|---|---|---|
| 5,235,435 A | * | 8/1993 | Schiller | 358/3.07 |
| 5,535,019 A | | 7/1996 | Eschbach | 358/456 |
| 5,708,728 A | * | 1/1998 | Nomura | 382/162 |
| 5,739,917 A | | 4/1998 | Shu et al. | 358/298 |
| 5,767,886 A | | 6/1998 | Kawakami et al. | |
| 5,949,965 A | | 9/1999 | Gondek | 395/109 |

FOREIGN PATENT DOCUMENTS

| | | |
|---|---|---|
| EP | 0501023 A2 | 9/1992 |
| EP | 0732843 A2 | 9/1996 |
| WO | WO02/05545 A1 | 1/2002 |

OTHER PUBLICATIONS

Lau et al., "Digital color halftoning with generalized error diffusion and multichannel green-noise masks," IEEE Trans. on Image Proc'ing, vol. 9, No. 5, May 2000.

* cited by examiner

*Primary Examiner*—Gabriel I Garcia

(57) ABSTRACT

A method of one embodiment of the invention is disclosed that determines to output an output pixel for a color component of an image pixel. In response to determining to output the output pixel for the color component of the image pixel, the method outputs this output pixel, and spaces out the output of output pixels for other color components of the image pixel.

45 Claims, 3 Drawing Sheets

SPACING OUT OUTPUT OF PIXELS FOR OTHER COLOR COMPONENTS UPON OUTPUT OF PIXEL FOR COLOR COMPONENT OF AN IMAGE PIXEL

BACKGROUND

Images may be represented as two-dimensional matrices of picture elements, or pixels. The spatial resolution and intensity level of each pixel are chosen to correspond to the type of output device being used. For example, computer monitors may display images at 75 dots per inch (DPI), and have 256 levels of intensity for each color component. Such monitors usually use the additive primary color components, red, green, and blue (RGB), which can be combined to produce millions of colors, as well as black. Pixels having more than two levels of intensity for each color component are referred to herein as image pixels.

However, image-forming devices that output onto media, such as ink-jet printers and laser printers, may be binary devices. In binary devices, for each pixel location on the printed medium, the device can print at two levels for each color component, on or off. The pixels output by such image-forming devices are referred to herein as output pixels. In binary devices, Image pixels, having more than two levels of intensity for each color component, are therefore converted to output pixels, having only two levels of intensity for each color component, prior to their output by image-forming devices onto media. Such conversion is commonly referred to as halftoning.

One halftoning approach is known as error diffusion. In error diffusion, for each color of an image pixel, the decision to output a corresponding output pixel by the image-forming device is based on the intensity level of the color component of the image pixel, as well as the output pixels output for the previous image pixels. Error diffusion tries to distribute output pixels so as to reduce pixel overlap, reduce empty space between output pixels, and otherwise create eye-pleasing patterns. However, at least some such approaches, such as plane-dependent halftoning, are usually successful only for colors of similar darkness, leading lead to unpleasant patterns for colors of varying darkness.

SUMMARY OF THE INVENTION

A method of one embodiment of the invention determines to output an output pixel for a color component of an image pixel. In response to determining to output the output pixel for the color component of the image pixel, the method outputs this output pixel, and spaces out the output of output pixels for other color components of the image pixel.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
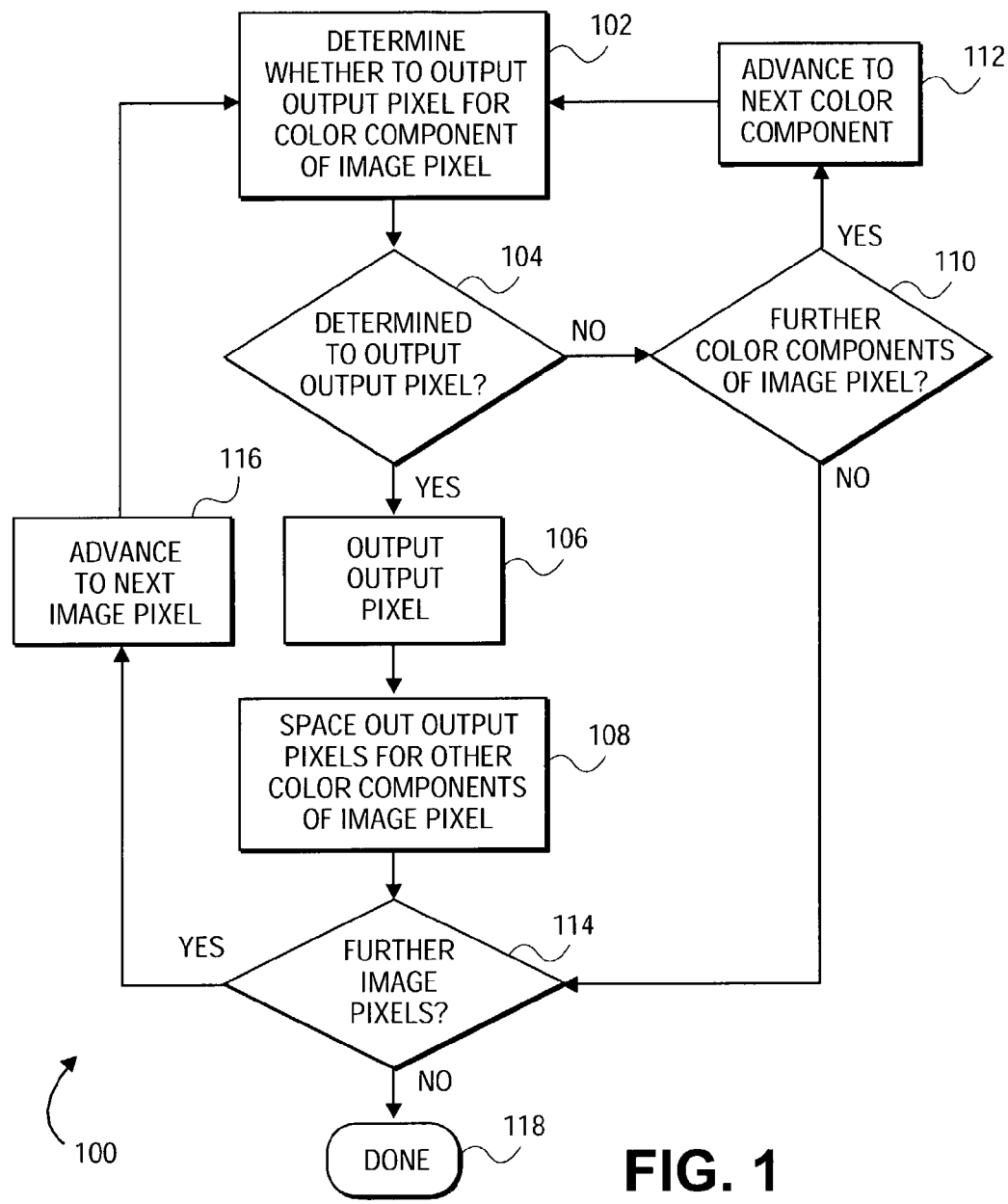
FIG. 1 is a flowchart of a method according to an embodiment of the invention.

FIG. 1 shows a method 100 according to an embodiment of the invention. Like the other methods of other embodiments of the invention, the method 100 can be implemented by computer-executable instructions, such as those of one or more computer programs, stored on a computer-readable medium. The computer-readable medium may be volatile or non-volatile memory, a magnetic, optical, and/or solid state memory, and so on. The method 100 is preferably performed in accordance with a halftoning approach, such as an error diffusion technique.

The method 100 determines whether an output pixel for a color component of an image pixel should be output (102). The manner by which the method 100 determines whether to output an output pixel for a color component of the image pixel is not limited by embodiments of the invention, and a specific approach for such determination is described in a later section of the detailed description. The image pixel is preferably one of a number of image pixels of image data. The image data has or already has been converted to the same color space as that of the output device, such as an image-forming device like a laser or an inkjet printer, which outputs the output pixels. For instance, the color space may be the cyan-magenta-yellow-black (CMYK) color space, as may be utilized in color inkjet printers. The method 100 also preferably starts at a first pixel of the image data, and at a darkest color component of the image pixel.

For each image pixel of the image data, there is an intensity value for each color component of the color space of the image data. For example, a given image pixel may have intensity values between 0 and 255 for each of the cyan, magenta, yellow, and black color components. An output pixel may be output for each color component of the image pixel. An output pixel is binary, having on and off states. That an output pixel has been output means that the on state of the output pixel has been output, such as corresponding to the ejection of ink or other fluid by the image-forming device, or such as the exposure of a region on a photoconductor corresponding to the output pixel by a laser in the image-forming device. That an output pixel has not been output means that the output pixel has the off state, such as corresponding to no ink or other fluid being ejected by the image-forming device, or no exposure of the region on the photoconductor corresponding to the output pixel.

If the method 100 has determined to output the output pixel (104), then the output pixel for the color component of the image pixel is output (106). For example, ink or other fluid may be ejected by the image-forming device where the device is an inkjet printer or other fluid-ejection device. This is known as firing the output pixel, since the inkjet pen corresponding to the color component of the image pixel is fired to output the output pixel. As another example, the location corresponding to the output pixel on a photoconductor of a laser pixel may be turned on or off such that toner is later applied to media at this location. That is, a region corresponding to the output pixel is set on the photoconductor or other laser-printing mechanism.

Next, the method 100 spaces out the output of output pixels for other color components of the image pixel (108), should such output pixels be determined to be output. This means that no output pixel, for no other color component of the image pixel, will likely be output for the image pixel. That is, rather than outputting other output pixels for other color components of the image pixel, such output pixels will instead be spaced out farther away from the output pixel that has been output in 106. Such spacing out of the output pixels allows for a better distribution of the output pixels, leading to a more eye-pleasing pattern of output pixels being output. A specific approach to spacing out of output pixels is described in a later section of the detailed description.

If there are further image pixels in the image data (114), then the method 100 advances to the next image pixel (116), and repeats 102, 104, and so on. If there are no further image pixels in the image data (114), then the method 100 is finished (118). However, if the method 100 has determined to not output an output pixel for the color component in 102 (104), and there are further color components of the image pixel (110), then the method 100 proceeds to advance to the next color component (112), and repeats 102, 104, and so on. For example, where the method 100 starts with the darkest color component, it then advances to the next-darkest color component, and so on, until the lightest color component is reached. In the context of the CMYK color space, this ordering is black, cyan, magenta, and yellow, or black, magenta, cyan, and yellow, from darkest to lightest. If there are no further color components of the image pixel (110), however, then the method proceeds to 114, as has been described.

In one embodiment of the invention, the determination in 102 as to whether to output an output pixel for a color component of an image pixel is performed in correlation with determining whether to output output pixels for one or more other color components of the image pixel. For example, one such approach is known as plane-dependent halftoning, because the decision as to whether an output pixel for one color component, or plane, is output is made in conjunction with the decision as to whether an output pixel for another, adjacent color component, or plane, is output. The two color components that are commonly correlated in this respect are cyan and magenta.

Figure 2:
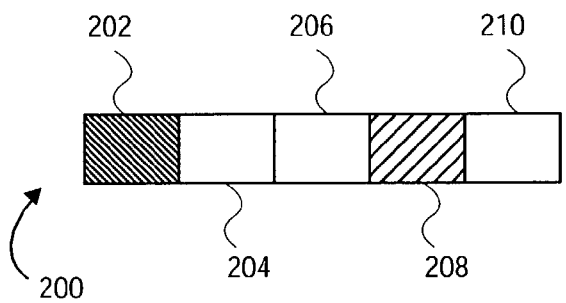
FIG. 2 is a diagram of a representative scenario depicting performance of the method of FIG. 1, according to an embodiment of the invention.

FIG. 2 shows a simple representative scenario 200 of the performance of the method 100 of FIG. 1, according to an embodiment of the invention. There are five locations at which an output pixel can be output, the pixel locations 202, 204, 206, 208, and 210, each corresponding to an image pixel of image data having the CMYK color space. As can be appreciated by those of ordinary skill within the art, there is likely to be a larger number of pixel locations than the two depicted in FIG. 2. For instance, image data may include hundreds, thousands, millions, or more image pixels, corresponding to a like number of pixel locations.

The pixel location 202 is blacked out, indicating that an output pixel for the black color component of an image pixel has been output. This means that output pixels for the other color components of the image pixel are likely to be spaced out relative to the black output pixel at the pixel location 202. For instance, the pixel location 208 is shaded, indicating that an output pixel for the magenta color component of an image pixel has been output. The method 100 has output the magenta output pixel at the pixel location 208, instead of at the pixel location 202, 204, or 206, so that the magnet output pixel is spaced out relative to the black output pixel at the pixel location 202.

Particular Embodiment of Method

Figure 3:
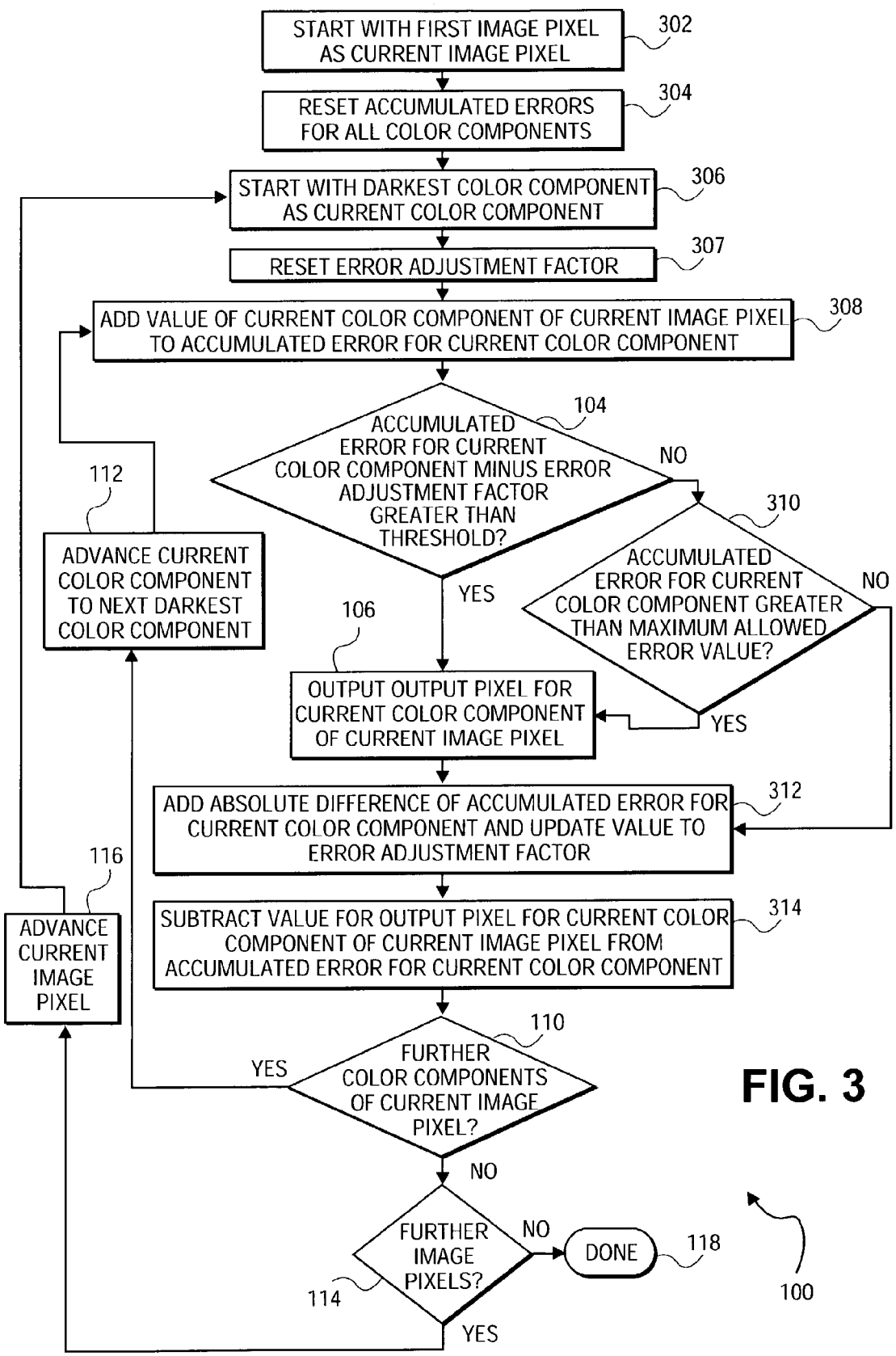
FIG. 3 is a flowchart of a method more detailed than but consistent with the method of FIG. 1, according to an embodiment of the invention.

FIG. 3 shows a more detailed embodiment of the method 100, which is consistent with the method 100 of the embodiment of FIG. 1. Like-numbered parts of the method 100 in the embodiments of FIGS. 1 and 3 achieve the same functionality in both the embodiments of FIGS. 1 and 3. However, the manner by which such functionality is described as being achieved in the embodiment of FIG. 3 does not limit the general functionality of such like-numbered parts that has already been described relative to the embodiment of FIG. 1.

The method 100 of the embodiment of FIG. 3 is described in relation to image data having a cyan-magenta-yellow-black (CMYK) color space. Each image pixel of the image data has an intensity value for each color component of the color space. The method 100 of the embodiment of FIG. 3 is further described in relation to there being 256 possible intensity values, from zero through 255, for each color component of each image pixel of the image data. That is, the CMYK color space is an eight-bit color space, since $2^8$ equals 256.

The method 100 starts with the first image pixel, such as the upper left-hand corner pixel, of the image data as the current image pixel (302). The method 100 initially resets the accumulated errors for all the color components (304). There is an accumulated error for each color component. The accumulated error for a color component is the running total of the differences between the intensity values for the color component of the image pixels and the values for the output pixels for the color component of the image pixels. Because the output pixels are binary, it is said that the lower value that an output pixel can have is zero, and the upper value that an output pixel can have is 255, or two to the power of the size of the color space, minus one. So, for example, if the intensity value for the cyan color component of a given image pixel is 186, and an output pixel was output for the cyan color component of this pixel, such that the output pixel has a value of 255, the difference (186-255) would be added to the accumulated error.

The method 100 further starts with the darkest color component as the current color component (306). The darkest color component of the CMYK color space is black, followed by cyan, magenta, and yellow, from darkest to lightest. An error adjustment factor is then reset (307), such that the error adjustment factor is reset each time there is a new current image pixel, prior to the color components of the current image pixel being examined. The error adjustment factor is utilized to determine whether an output pixel should be output for a color component of an image pixel. More particularly, the error adjustment factor is utilized to space out the output of output pixels for color components of image pixels.

Spacing out the output of output pixels in the embodiment of FIG. 3 is based on the insight that when the accumulated error for a given color component is relatively small, an output pixel for the color component has likely recently been output. Furthermore, when the accumulated error for a given color component is relatively large, an output pixel for the color component is likely to be output very soon. These insights are employed in conjunction with the error adjustment factor to effectively manage the output of output pixels so that they are better distributed, and result in a more eye-pleasing pattern. That is, the insights are implemented within the error adjustment factor to effectively hasten or delay the output of output pixels as appropriate so that they are better distributed.

The intensity value of the current color component of the current image pixel is added to the accumulated error for the current color component (308), and the method 100 determines whether an output pixel should be output for the current color component of the current image pixel (104). More specifically, the method 100 determines in 104 whether the accumulated error for the current color component minus the error adjustment factor is greater than a threshold. The threshold may be 128, or half the value of two to the power of the size of the color space. If the method 100 determines that an output pixel should be output for the current color component of the current image pixel, then the output pixel for the current color component of the current image pixel is output (106).

The absolute difference between the accumulated error for the current color component and an update value is then added to the error adjustment factor to update the error adjustment factor (312). The update value in one embodiment of the invention is half of the threshold utilized in 104, or one-fourth of the value of two to the power of the size of the color space. That is, the update value may be 64 in one embodiment of the invention. The error adjustment factor is thus utilized to bias whether an output pixel is output for the current color component of the current image pixel in 104. As the error adjustment factor increases in 312, it is less likely that output pixels will be output for subsequent color components of the current image pixel, unless the accumulated errors for those color components are relatively large.

The value for the output pixel for the current color component of the current pixel is then subtracted from the accumulated error for the current color component (314). This distributes the error for the current color component, for determining whether an output pixel should be output for the current color component of subsequent image pixels in 104. As has been described, it is said that the value of the output pixel when the output pixel was actually output is 255, whereas the value of the output pixel when no output pixel was actually output is zero. This is because the output pixel is binary, having a maximum value, or 255, when the output pixel is output, and having a minimum value, or zero, when it is not output.

However, referring back to 104, if the accumulated error for the current color component minus the error adjustment factor is not greater than the threshold, then the method 100 proceeds to 310 instead of to 106. The method 100 in 310 determines whether the accumulated error for the current color component is greater than a maximum allowed error value, which can be defined in a number of different manners. In one embodiment, the maximum allowed error value is the maximum allowed intensity of a color component of an image pixel, or two to the power of the size of the color space. In another embodiment, the maximum allowed error value is two times the threshold that is utilized in 104 of the method 100 of the embodiment of FIG. 3. Thus, the maximum allowed error value can be, for instance, 256. If the method 100 determines that the accumulated error for the current color component is greater than the maximum allowed error value (310), then the output pixel for the current color component of the current image pixel is output (106).

After an output pixel has been output for the current color component of the current image pixel (106), either resulting from the method 100 proceeding from 104 or 310 to 106, then the error adjustment factor is updated (312), and the accumulated error for the current color component is updated (314), as has been described. Furthermore, where no output pixel has been output for the current color component of the current image pixel, resulting from the method 100 proceeding from 104 to 310, then the error adjustment factor (312) and the accumulated error (314) are still updated. The method 100 next determines whether there are any further color components of the current image pixel (110). If there are, the current color component is advanced to the next darkest color component (112), such as from black to cyan, from cyan to magenta, or from magenta to yellow. The method 100 then repeats 308 as has been described.

If there are not any further color components of the current image pixel (110), then the method 100 determines whether there are any further image pixels of the image data (114). If there are, then the method 100 advances the current image pixel to the next image pixel (116), and repeats 306 as has been described. If there are not, then the method 100 is finished (118).

Image-Forming and Computing Devices

Figure 4:
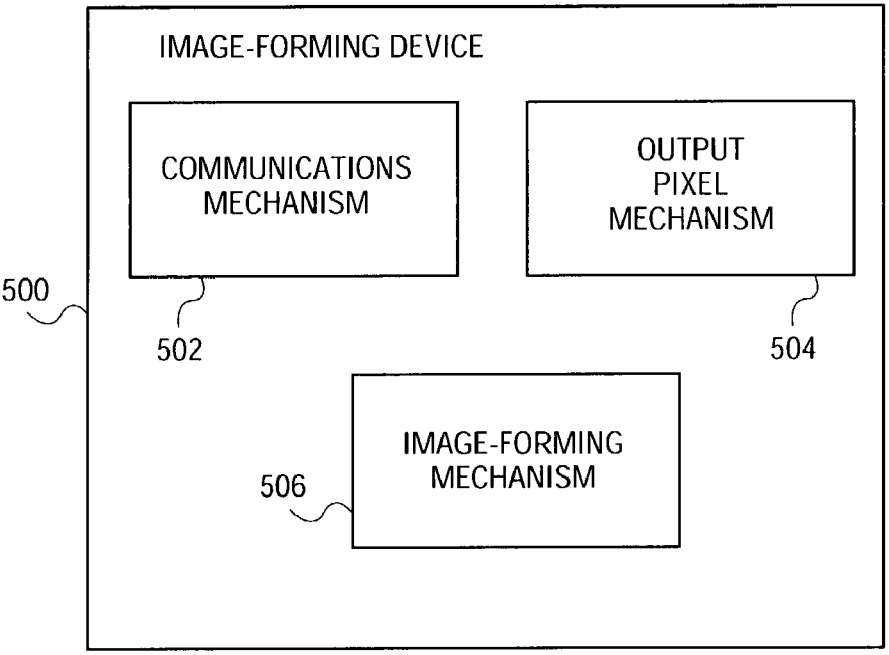
FIG. 4 is a block diagram of an image-forming device, according to an embodiment of the invention.
Figure 5:
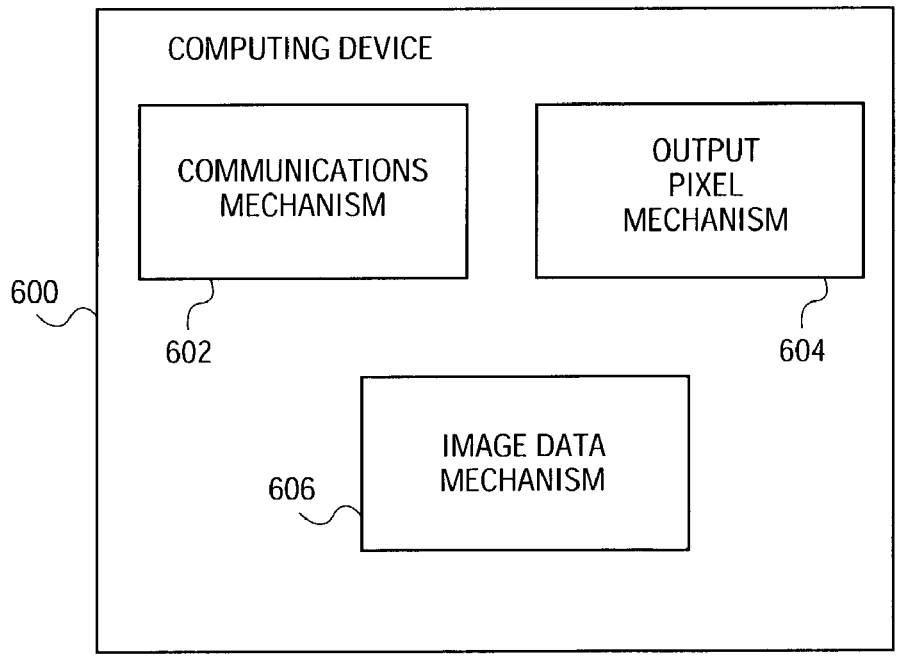
FIG. 5 is a block diagram of a computing device, according to an embodiment of the invention.

FIGS. 4 and 5 show block diagrams of different devices, according to varying embodiments of the invention, which can perform the method 100 of FIGS. 1 and 3. In FIG. 4, an image-forming device 500 is depicted, according to an embodiment of the invention. The image-forming device 500 may be an inkjet printer, a laser printer, or another type of image-forming device. The image-forming device 500 includes a communications mechanism 502, an output pixel mechanism 504, and an image-forming mechanism 506. As can be appreciated by those of ordinary skill within the art, the device 500 can include other mechanisms in addition to or in lieu of the mechanisms depicted in FIG. 4. The image-forming device 500 forms images on media, such as paper and other types of media.

The communications mechanism 502 receives image data that has a number of image pixels, from a communicatively coupled source device, such as a computing device like a computer, a digital camera, a personal digital assistant (PDA) device, or another type of computing device. The communications mechanism 502 may include wired and/or wireless communications adapters, such as serial ports, Universal Serial Bus (USB) ports, parallel ports, Ethernet adapters, 802.11b wireless network adapters, Bluetooth wireless adapters, and so on.

The output pixel mechanism 504 performs the method 100 of the embodiments of FIGS. 1 and/or 3 that have been described. That is, the output pixel mechanism 504 determines whether, for each color component of each image pixel, an output pixel should be output. The output pixel mechanism 504 may include computer-executable instructions organized as computer programs, subroutines, modules, objects, and so on.

The output pixel mechanism 504 outputs the output pixels by utilizing the image-forming mechanism 506, which actually forms images on media. In the case where the image-forming device 500 is an inkjet printer, the image-forming mechanism 506 may be an inkjet-printing mechanism. Similarly, in the case where the image-forming device 500 is a laser printer, the image-forming mechanism 506 may be a laser-printing mechanism. The image-forming mechanism 506 may be another type of image-forming mechanism as well.

FIG. 5 shows a computing device 600, according to an embodiment of the invention. The phrase computing device is used generally, such that the device may be a computer, like a desktop or a laptop computer, a personal digital assistant (PDA) device, a digital camera, or another type of computing device. The computing device 600 includes a communications mechanism 602, the output pixel mechanism 604, and an image data mechanism 606. As can be appreciated by those of ordinary skill within the art, the device 600 can include other mechanism in addition to or in lieu of the mechanisms depicted in FIG. 5.

The communications mechanism 602 is for communicating with an image-forming device, like the device 500 of FIG. 4, such that the device 600 is communicatively coupled with the device 500. The mechanism 602 may thus include wired and/or wireless communications adapters, as have been described. The communications mechanism 602 more specifically sends the output pixels for the color components of the image pixels to the image-forming device 500 for image formation corresponding thereto on media.

The output pixel mechanism 604 thus performs the method 100 of the embodiments of FIGS. 1 and/or 3 that have been described. Once the output pixel mechanism 604 determines whether, for each color component of each image pixel, an output pixel should be output, such output pixels are sent by the communications mechanism 602 to the image-forming device. Thus, the output pixel mechanism 604 outputs the output pixels by utilizing the image-forming device to which the device 600 is communicatively coupled. The output pixel mechanism 604 can include computer-executable instructions organized as computer programs, subroutines, modules, objects and so on.

The image data mechanism 606 receives the image data that includes the image pixels for which the output pixel mechanism 604 determines whether output pixels should be output. The image data mechanism 606 may receive the image data from an internal or external source. For instance, the image data mechanism 606 may internally receive the image data from an application program running on the computing device 600, or externally from a peripheral device communicatively coupled to the computing device 600. Like the output pixel mechanism 604, the image data mechanism 606 may include computer-executable instructions organized as computer programs, subroutines, modules, objects, and so on, and, like the communications mechanism 602, the mechanism 606 may include wired and/or wireless communications adapters.

Multi-level Halftoning

Embodiments of the invention have been described thus far are particularly related to binary halftoning, in which an output pixel for a given color component of an image pixel is either on or off. That is, the output pixel may have one of two values. However, as can be appreciated by those of ordinary skill within the art, other embodiments of the invention can be utilized in conjunction with multi-level halftoning, in which an output pixel for a given color component of an image pixel may have one of a number of different values. For example, within an inkjet printer, a given output pixel may correspond to zero, one, or two drops of ink, such that there are three different values that the output pixel can have.

In one embodiment, to accomplish such multi-level halftoning, the color component of an image pixel is effectively divided into a number of levels. For instance, there may be three levels, eight-bit values between zero and X, eight-bit values greater than X and less than Y, and eight-bit values greater than or equal to Y. Whereas in the binary halftoning embodiment that has been described an output pixel has a value of 255, such that ink is actually output, above a given threshold, and has a value of zero, such that ink is not output, below a given threshold, in this multi-level halftoning embodiment, there are two thresholds. At or below X, no ink is output, and at or above Y there is maximum ink output, while between X and Y there is a lesser amount of ink output. For example, one drop of ink may be output for an output pixel having a value between X and Y, whereas two or more drops of ink may be output for an output pixel having a value at or above Y.

As can be appreciated by those of ordinary skill within the art, other multi-level halftoning approaches are also amenable to embodiments of the invention. For example, if the color component of an image pixel has a value of 127, this may be referred to as base level zero, such that there is a scaled so-called contone value of 253. If the value is 128, then this may be referred to as base level one, such that there is a scaled contone value of zero. Thus, if the value is 64, then this may be referred to as base level zero with a scaled contone value of 128. Therefore, there are break points at zero, 128, and 255, such that values under 128 receive base level zero and scaled contone values of $$255 \times \frac{\text{value}}{128},$$

and values above 128 receive base level one and scaled contone values of $$255 \times \frac{\text{value} - 128}{128}.$$

A lookup table may alternatively be used to obtain the base level and scaled contone value. The end result is then that binary halftoning can be used on the scaled contone value, and the result of the binary halftoning added to the base level.

CONCLUSION

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

I claim:

1. A method comprising:
    determining whether to output an output pixel for a color component of an image pixel in correlation with determining whether to output pixels for other color components of the image at a location, by determining whether an accumulated error for the color component of the image pixel minus an error adjustment factor is greater than a threshold;
    in response to determining to output the output pixel for the color component of the image pixel,
        outputting the output pixel for the color component of the image pixel;
        spacing out output of the output pixels for the other color components of the image pixel; and, updating the error adjustment factor by adding to the error adjustment factor an absolute difference of the accumulated error for the color component and half of the threshold.

2. The method of claim 1, wherein spacing out output of the output pixels for the other color components of the image pixel comprises, for each color component of the other color components, in response to determining that the accumulated error minus the error adjustment factor is greater than the threshold, outputting the output pixel for the color component of the image pixel.

3. The method of claim 2, wherein spacing out output of the output pixels for the other color components of the image pixel further comprises, in response to determining that the accumulated error for the color component is greater than a maximum allowed error value, outputting the output pixel for the color component of the image pixel.

4. The method of claim 1, further initially comprising determining the accumulated error for the color component of the image pixel.

5. The method of claim 4, wherein determining the accumulated error for the color component comprises adding to the accumulated error for the color component a value for the color component of the image pixel.

6. The method of claim 1, further comprising updating the accumulated error for the color component.

7. The method of claim 6, wherein updating the accumulated error for the color component comprises subtracting from the accumulated error for the color component a value for the output pixel for the color component of the image pixel.

8. The method of claim 1, wherein determining to output the output pixel for the color component of the image pixel comprises utilizing a binary halftoning approach to determine whether to output the output pixel for the color component of the image pixel.

9. The method of claim 1, wherein determining to output the output pixel for the color component of the image pixel further comprises utilizing a multi-level halftoning approach to determine whether to output the output pixel for the color component of the image pixel.

10. The method of claim 1, further comprising proceeding to a next image pixel.

11. The method of claim 1, further comprising, otherwise, repeating the method for each of the other color components of the image pixel.

12. The method of claim 11, wherein the color component is a darkest color component of the image pixel, and the method repeats for each of the other color components from a darkest of the other color components to a lightest of the other color components.

13. The method of claim 12, wherein the color component is black, and the other color components are cyan, magenta, and yellow.

14. The method of claim 1, wherein the color component is a darkest color component of the image pixel.

15. The method of claim 14, wherein the color component is black.

16. The method of claim 1, wherein outputting the output pixel for the color component of the image pixel comprises firing the output pixel for the color component of the image pixel.

17. The method of claim 1, wherein outputting the output pixel for the color component of the image pixel comprises ejecting fluid by a fluid-ejecting mechanism corresponding to the output pixel for the color component of the image pixel.

18. The method of claim 17, wherein ejecting the fluid corresponding to the output pixel for the color component of the image pixel comprises ejecting ink by an inkjet-printing mechanism corresponding to the output pixel for the color component of the image pixel.

19. The method of claim 1, wherein outputting the output pixel for the color component of the image pixel comprises setting a region corresponding to the output pixel for the color component of the image pixel.

20. The method of claim 19, wherein setting the output pixel for the color component of the image pixel comprises setting a region on a laser-printing mechanism corresponding to the output pixel for the color component of the image pixel.

21. The method of claim 1, wherein outputting the output pixel for the color component of the image pixel comprises ejecting ink in accordance with a binary halftoning approach.

22. The method of claim 1, wherein outputting the output pixel for the color component of the image pixel comprises ejecting one or more drops of ink, depending on a level of the output pixel for the color component, in accordance with a multi-level halftoning approach.

23. A method comprising:
for each color component of a plurality of color components of an image pixel, from darkest to lightest:
in response to determining that an accumulated error for the color component minus an error adjustment factor is greater than a threshold, outputting the output pixel for the color component of the image pixel; and,
updating the error adjustment factor by adding to the error adjustment factor an absolute difference of the accumulated error for the color component and half of the threshold;
wherein whether an output pixel for a color component of the image pixel is output at a location is determined in correlation with determining whether output pixels for other color components of the image pixel is output at the location.

24. The method of claim 23, further comprising, for each color component of the plurality of color components of the image pixel, from darkest to lightest, in response to determining that the accumulated error for the color component is greater than a maximum allowed error value, outputting the output pixel for the color component of the image pixel.

25. The method of claim 23, further initially comprising, for each color component of the plurality of color components of the image pixel, from darkest to lightest, determining the accumulated error for the color component as the accumulated error for the color component plus a value for the color component of the image pixel.

26. The method of claim 23, further comprising, for each color component of the plurality of color components of the image pixel, from darkest to lightest, subtracting from the accumulated error for the color component a value for the output pixel for the color component of the image pixel.

27. The method of claim 23, further comprising, repeating the method for each of a plurality of other image pixels.

28. The method of claim 23, wherein the plurality of color components are, from darkest to lightest, black, cyan, magenta, and yellow.

29. The method of claim 23, wherein outputting the output pixel for the color component of the image pixel comprises ejecting fluid by a fluid-ejecting mechanism corresponding to the output pixel for the color component of the image pixel.

30. A computer-readable medium having computer-executable instructions stored thereon to perform a method comprising:
for each image pixel of a plurality of image pixels, for each color component of a plurality of color components of the image pixel, from darkest to lightest, adding to an accumulated error for the color component a value for the color component of the image pixel;

in response to determining that the accumulated error for the color component minus an error adjustment factor is greater than a threshold, outputting an output pixel for the color component of the image pixel;

in response to determining that the accumulated error for the color component is greater than a maximum allowed error value, outputting the output pixel for the color component of the image pixel;

updating the error adjustment factor by adding to the error adjustment factor an absolute difference of the accumulated error for the color component and half of the threshold;

adding to the error adjustment factor an absolute difference of the accumulated error for the color component and an update value; and, subtracting from the accumulated error for the color component a value for the output pixel for the color component of the image pixel, wherein whether an output pixel for a color component of an image pixel is output at a location is determined in correlation with determining whether output pixels for other color components of the image pixel is output at the location.

31. The computer-readable medium of claim 30, wherein adding to the error adjustment factor the absolute difference of the accumulated error for the color component and the update value comprises adding to the error adjustment factor the absolute difference of the accumulated error for the color component and half of the threshold.

32. The computer-readable medium of claim 30, wherein the plurality of color components are, from darkest to lightest, black, cyan, magenta, and yellow.

33. The computer-readable medium of claim 30, wherein outputting the output pixel for the color component of the image pixel comprises ejecting fluid by a fluid-ejecting mechanism corresponding to the output pixel for the color component of the image pixel.

34. A device comprising:

a first mechanism to receive image data including a plurality of image pixels; and, a second mechanism to, for each color component of a plurality of color components of each image pixel of the plurality of image pixels of the image data, output an output pixel for the color component of the image pixel where an accumulated error for the color component minus an error adjustment factor is greater than a threshold, wherein whether an output pixel for a color component of the image pixel is output at a location is determined in correlation with determining whether output pixels for other color components of the image pixel is output at the location, and wherein the error adjustment factor is updated by adding to the error adjustment factor an absolute difference of the accumulated error for the color component and half of the threshold.

35. The device of claim 34, wherein the second mechanism further outputs the output pixel for the color component of the image pixel where the accumulated error for the color component is greater than a maximum allowed error value.

36. The device of claim 34, wherein the device is a computing device communicatively coupled to an image-forming device.

37. The device of claim 36, further comprising a third mechanism to send the output pixel for each color component of the plurality of color components of each image pixel of the plurality of image pixels to the image-forming device for image formation corresponding thereto on media.

38. The device of claim 36, wherein the first mechanism receives the image data internally from within the computing device.

39. The device of claim 34, wherein the device is an image-forming device communicatively coupled to a source device, for image formation corresponding to the plurality of image pixels on media.

40. The device of claim 39, wherein the first mechanism receives the image data from the source device.

41. The device of claim 39, wherein the image-forming device is one of an inkjet printer and a laser printer.

42. The device of claim 34, wherein the plurality of color components are black, cyan, magenta, and yellow.

43. A device comprising:

a mechanism to receive image data including a plurality of image pixels; and, means for, for each color component of a plurality of color components of each image pixel of the plurality of image pixels of the image data, outputting an output pixel for the color component of the image pixel in response to one of an accumulated error for the color component minus an error adjustment factor is greater than a threshold, and, the accumulated error for the color component is greater than a maximum allowed error value, wherein whether an output pixel for a color component of the image pixel is output at a location is determined in correlation with determining whether output pixels for other color components of the image pixel is output at the location, and wherein the error adjustment factor is updated by adding to the error adjustment factor an absolute difference of the accumulated error for the color component and half of the threshold.

44. The device of claim 43, wherein the device is one of a computing device communicatively coupled to an image-forming device, and the image-forming device communicatively coupled to the computing device.

45. The device of claim 43, wherein the plurality of color components are black, cyan, magenta, and yellow.

* * * * *

UNITED STATES PATENT AND TRADEMARK OFFICE
CERTIFICATE OF CORRECTION

PATENT NO.        : 7,502,138 B2                                    Page 1 of 1
APPLICATION NO. : 10/304492
DATED             : March 10, 2009
INVENTOR(S)       : Jason Quintana It is certified that error appears in the above-identified patent and that said Letters Patent is hereby corrected as shown below:

In column 8, line 57, in Claim 1, after "output" insert -- output --.

In column 12, line 27, in Claim 41, delete "of" and insert -- of: --, therefor.

In column 12, line 37, in Claim 43, delete "of" and insert -- of: -- therefor.

In column 12, line 50, in Claim 44, delete "of" and insert -- of: --, therefor.

Signed and Sealed this

Fourteenth Day of July, 2009

JOHN DOLL
*Acting Director of the United States Patent and Trademark Office*